United States Patent [19]

Anderson

[11] Patent Number: 5,721,612
[45] Date of Patent: Feb. 24, 1998

[54] OPTICAL PRESSURE SENSOR AND METHOD THEREFOR

[75] Inventor: Samuel J. Anderson, Tempe, Ariz.

[73] Assignee: Motorola, Inc., Schaumburg, Ill.

[21] Appl. No.: 693,625

[22] Filed: Aug. 8, 1996

[51] Int. Cl.$^6$ .................................................. G01B 9/02
[52] U.S. Cl. ........................................ 356/35.5; 356/347
[58] Field of Search .............................. 356/35.5, 347, 356/345; 385/12, 14

[56] References Cited

U.S. PATENT DOCUMENTS 5,500,912  3/1996  Alonas et al. ..................... 359/15

OTHER PUBLICATIONS

Wm. Gambogi et al., "Advances and Applications of DuPont Holographic Photopolymers", Optics Quebec ', 93, Conf. 2043, Aug. 1993, pp. 1–11.

Dupont, "DuPont's New OmniDex Family of Holographic Materials", DuPont Imaging Systems, Wilmington, DE, 2 pages, no date available.

Brian Culshaw, "Fibre Optic Sensor: Integration with Micromachined Devices", Sensors and Actuators A 46–47, 1995, pp. 463–469.

O. Helleso et al., "Interferometric Displacement Sensor made by Intergrated Optics on Glass", Sensors and Actuators A 46–47, 1995, pp. 478–481.

Primary Examiner—Frank G. Font
Assistant Examiner—Amanda Merlino
Attorney, Agent, or Firm—Robert F. Hightower

[57] ABSTRACT

An optical pressure sensor (10) uses a holographic link (41) to couple light (17) from an optical interferometer (40) to a pressure sensing element (13), and to couple return light (18) back to an optical interferometer (40). The optical link (41) uses holographic reflectors (24, 26, 27, 28, 29, and 31) to guide the light (17, 18) through the optical link (41).

17 Claims, 1 Drawing Sheet

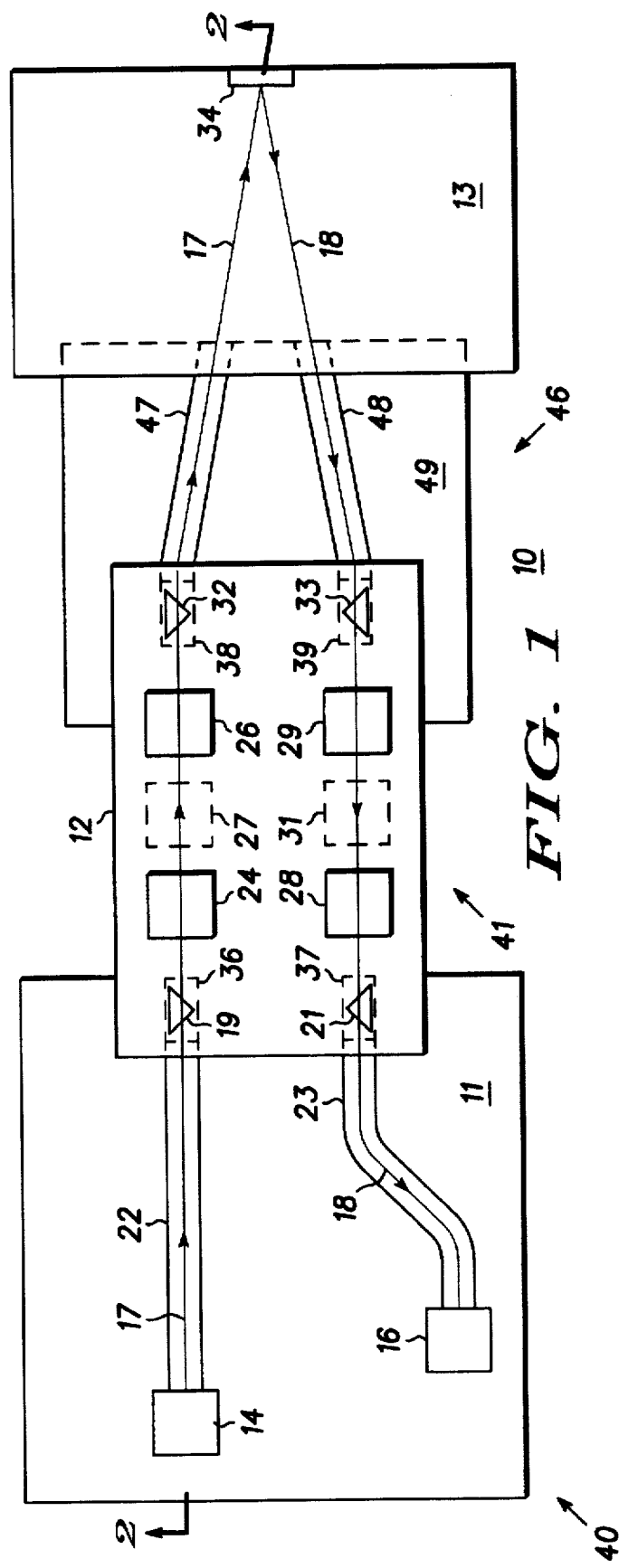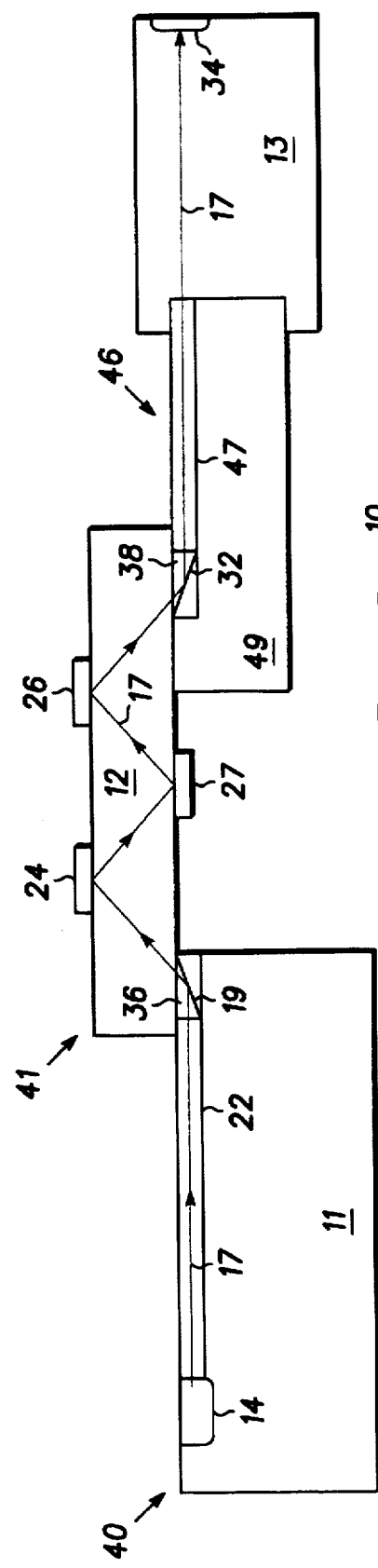

OPTICAL PRESSURE SENSOR AND METHOD THEREFOR

BACKGROUND OF THE INVENTION

The present invention relates, in general, to sensors, and more particularly, to a novel optical sensor.

In the past, pressure sensors that are placed in high electrical noise environments have utilized fiber optic cables to minimize susceptibility to the electrical noise. In such systems, a control chip containing an optical processing unit typically transmits light to a pressure transducer via a fiber optic cable. One disadvantage of such systems is the system cost. Because it is difficult and expensive to terminate the ends of fiber optic cables in a manner that provides efficient coupling, the system cost is high. Additionally, it is difficult and expensive to attach or mount the fiber optic cable to the pressure transducer thereby further increasing system costs.

Accordingly, it is desirable to have a pressure sensor that has a low cost optical transmission path, and that provides efficient and low cost coupling to both the control unit and to the pressure transducer.

BRIEF DESCRIPTION OF THE DRAWINGS

FIG. 1 illustrates an enlarged top view of a pressure sensor in accordance with the present invention; and FIG. 2 illustrates a cross-sectional view of the FIG. 1 pressure sensor in accordance with the present invention.

DETAILED DESCRIPTION OF THE DRAWINGS

FIG. 1 illustrates a top view of an optical pressure sensor 10. Sensor 10 includes an optical interferometer 40 that is optically coupled to a holographic link 41 in order to couple a transmitted or emitted light beam 17 to a pressure sensing element 13, and to receive a return light beam or return light beam 18 from element 13. Interferometer 40 is formed on a substrate 11 that is suitable for either the formation thereon or attachment thereto of an optical emitter 14, an optical detector 16, a transmitted optical waveguide 22, and a return optical waveguide 23. Emitter 14 is coupled to waveguide 22 to emit beam 17, and detector 16 is coupled to waveguide 23 for receiving light 18. Such interferometers are well known in the art as illustrated by the example disclosed by Helleso et al., "Interferometric Displacement Sensor Made By Integrated Optics On Glass", Sensors And Actuators, pp. 478–481, 1995. Typically, substrate 11 is a semiconductor substrate, such as silicon or GaAs, so that emitter 14, detector 16, and waveguides 22 and 23 can easily be formed on substrate 11.

Waveguides 22 and 23 generally are an optically transparent medium that is positioned in a trench or groove etched in substrate 11. For example, waveguides 22 and 23 can be formed from silicon dioxide ($SiO_2$), or lithium niobate ($LiNbO_3$) that is deposited into the trench or groove. In order to guide beam 17 from waveguide 22 into link 41, a directional reflector 19 is positioned near the end of waveguide 22. The positioning is accomplished by forming an opening or trench 36 in substrate 11 at the end of waveguide 22. Generally, trench 36 is formed by etching an opening in substrate 11, and has a size suitable for mounting reflector 19. Alternately, a portion of waveguide 22 may be etched away to form trench 36. Reflector 19 generally includes a holographic reflective material that is mounted at an angle suitable for reflecting beam 17 into link 41 at an angle for guiding beam 17 through link 41. The holographic reflective material can be mounted on an optically transparent material, such as prism shaped plexiglas, which is then mounted within trench 36. Beam 17 exits waveguide 22, travels though the space within trench 36, impinges the holographic reflective material of reflector 19, and is reflected into link 41.

Holographic link 41 includes an optically transparent or optical substrate 12 having a first plurality of holographic reflectors that guides beam 17 through link 41 to sensor element 13. Substrate 11 can be a variety of optical materials including, but not limited to glass, plastic, plexiglas, transparent semiconductor materials such as GaAs and silicon nitride, quartz, transparent polymers, etc. The first plurality of holographic reflectors includes holographic linking reflectors 24, 26, and 27 that are positioned to reflect beam 17 at various angles in order to guide beam 17 through link 41. For such purpose, reflectors 24 and 26 are positioned on a first or top surface of substrate 12 while reflector 27 is positioned on an opposite or second or bottom surface of substrate 12. Reflector 27 is shown in phantom on FIG. 1 because it is on the opposite surface. Similarly, a second plurality of holographic reflectors including holographic reflectors 28, 29, and 31, guide return beam 18 from element 13 to interferometer 40. One of skill in the art recognizes the relative positions required for reflectors 24, 26, 27, 28, 29, and 31. The material used for reflectors 24, 26, 27, 28, 29, and 31 includes a holographic photopolymer that is well known to those skilled in the art. One example of such a holographic photopolymer is OminDex™ from Du Pont Imaging Systems, Wilmington, Del.

A sensor guide 46 couples beam 17 from link 41 into sensor 13, and couples return light 18 from element 13 into link 41. As will be seen hereinafter, guide 46 includes an optical substrate 49 that is similar to substrate 11. Guide 46 has a transmitted and a return channel for guiding beams 17 and 18. The transmitted channel includes a trench 38, a transmitted directional holographic reflector 32, and a waveguide 47 that are similar to trench 36, reflector 19, and waveguide 22, respectively, that are in substrate 11. Reflector 32 receives beam 17 from link 41 and guides the beam toward a sensor reflector 34 that is mounted in sensor 13. Reflector 32 is mounted or positioned at a suitable angle to reflect beam 17 into waveguide 47. Similarly, a return trench 39, a return reflector 33, and a return waveguide 48 that are similar to trench 38, reflector 32, and waveguide 47, respectively, are utilized to couple return beam 18 to link 41. It should be noted that trenches 38 and 39, reflectors 32 and 33, and waveguides 47 and 48 typically cannot be seen from a top view but are shown here for purposes of illustration.

Alternately link 41 may be coupled directly to element 13 so that guide 46 is not required. For example, guide 46 could be eliminated by applying a holographic reflector, such as reflector 32, directly to link 41 thereby guiding beam 17 directly from link 41 to element 13. Additionally, beam 17 can be directed or guided directly into waveguide 47. Such direct guiding can be accomplished by extending waveguide 47 to intercept beam 17. Because waveguide 47 has a higher index of refraction than the surrounding material of substrates 11 and 49, beam 17 is constrained within waveguide 47.

Sensor element 13 typically is a passive pressure sensing element such as a Fabry-Perot cavity that is well known to those skilled in the art.

FIG. 2 illustrates an enlarged cross-sectional view of sensor 10 along line 2—2 shown in FIG. 1. Elements of FIG. 2 having the same reference number as FIG. 1 are the same as the corresponding FIG. 1 elements. As shown by FIG. 2, optical emitter 14 emits light beam 17 which travels through waveguide 22 until entering the opening formed by trench 36, then beam 17 strikes directional reflector 19 that is mounted in trench 36. Reflector 19 deflects or guides beam 17 into link 41 at an angle so that beam 17 strikes holographic reflector 24 thereby deflecting or guiding beam 17 to strike reflector 27 which deflects or guides beam 17 to strike reflector 26. Reflector 26 deflects or guides beam 17 to exit link 41 and enter sensor guide 46 which guides or deflects beam 17 into element 13. Beam 17 enters the cavity formed by trench 38 and strikes directional reflector 32 that is mounted therein. Reflector 32 guides beam 17 at an angle sufficient to strike sensor reflector 34 thereby generating return light 18 (as shown in FIG. 1). As pressure is applied to element 13, the distance between reflector 34 and guide 46 changes thereby changing the phase of the return light 18. This phase change is detected by interferometer 40 which can then be translated to a pressure differential.

By now it should be apparent that there has been provided a novel optical sensor and method. Utilizing a holographic link for coupling the interferometer to the sensor element provides for a low cost transmission medium. The holographic link eliminates the need for optical fibers and the expensive terminations required for optical fibers thereby further reducing the optical sensor costs.

I claim:

1. A pressure sensing method comprising:
   providing an optical interferometer;
   providing a pressure sensing element; and
   coupling the optical interferometer to the pressure sensing element by using a holographic link for guiding a light beam from the optical interferometer to the pressure sensing element, and using the holographic link for guiding a return light beam from the pressure sensing element to the optical interferometer.

2. The method of claim 1 wherein providing the optical interferometer includes using a semiconductor substrate having an optical detector coupled to an optical waveguide for receiving the return light beam.

3. The method of claim 1 wherein using the holographic link includes using an optical substrate having a first linking holographic reflector on a first surface of the optical substrate and a second linking holographic reflector on a second surface of the optical substrate for guiding the light beam from the optical interferometer to the pressure sensing element.

4. The method of claim 1 wherein providing the optical interferometer includes using a semiconductor substrate having an optical emitter coupled to an optical waveguide for emitting the light beam.

5. The method of claim 1 wherein providing the pressure sensing element includes using a passive pressure sensing element.

6. The method of claim 1 wherein using the holographic link includes mounting a directional holographic reflector in the optical interferometer for coupling the light beam from the optical interferometer to the holographic link.

7. The method of claim 6 wherein mounting the directional holographic reflector includes etching an opening in a transmission medium that is on the optical interferometer for directing light, and mounting the directional holographic reflector at an angle to guide the light into the holographic link and toward a first linking holographic reflector on a surface of the holographic link.

8. A method of sensing pressure comprising:
   emitting a light beam from an optical interferometer;
   coupling the light beam to a holographic link having an optical substrate, a first plurality of holographic reflectors, and a second plurality of holographic reflectors;
   guiding the light beam through the holographic link to a pressure sensing element by using the first plurality of holographic reflectors;
   coupling the light beam to the pressure sensing element;
   generating a return light beam from the pressure sensing element;
   coupling the return light beam from the pressure sensing element to the holographic link; and
   guiding the return light beam through the holographic link to the optical interferometer by using the second plurality of holographic reflectors.

9. The method of claim 8 wherein emitting the light beam from the optical interferometer includes emitting the light beam from a semiconductor substrate having an optical emitter coupled to an optical waveguide.

10. The method of claim 9 wherein emitting the light beam from the semiconductor substrate having the optical emitter coupled to the optical waveguide includes mounting a directional holographic reflector adjacent an end of the optical waveguide for coupling the light beam from the optical interferometer to the holographic link.

11. The method of claim 10 wherein mounting the directional holographic reflector includes etching an opening in the optical waveguide and mounting the directional holographic reflector at an angle to guide the light beam into the holographic link and toward one of the first plurality of holographic reflectors.

12. The method of claim 8 wherein providing the pressure sensing element includes using a passive pressure sensing element.

13. A pressure sensor comprising:
    an optical interferometer;
    a pressure sensing element; and
    a holographic link suitable for coupling a light beam from the optical interferometer to the pressure sensing element, and suitable for coupling a return light beam from the pressure sensing element to the optical interferometer.

14. The pressure sensor of claim 13 wherein the optical interferometer includes a semiconductor substrate, an optical emitter on the semiconductor substrate wherein the optical emitter is coupled to an optical wave guide formed on the semiconductor substrate, and an optical detector formed on the semiconductor substrate wherein the optical detector is coupled to the optical waveguide.

15. The pressure sensor of claim 13 wherein the pressure sensing element is a passive pressure sensing element.

16. The pressure sensor of claim 15 wherein the passive pressure sensing element includes a Fabry-Perot cavity.

17. The pressure sensor of claim 13 wherein the holographic link includes an optical substrate having a first holographic reflector on a first surface of the optical substrate and a second holographic reflector on a second surface of the optical substrate arranged to guide the light beam from the optical interferometer to the pressure sensing element.

* * * * *